US012772987B2

(12) United States Patent
Juul et al.

(10) Patent No.: US 12,772,987 B2
(45) Date of Patent: Oct. 27, 2026

(54) MILK FAT REPLACER FOR CHOCOLATE OR CHOCOLATE-LIKE PRODUCTS

(71) Applicant: AAK AB (PUBL), Malmö (SE)

(72) Inventors: Bjarne Juul, Aarhus C (DK); Hannah Solati Simonsen, Aarhus C (DK)

(73) Assignee: AAK (PUBL), Malmö (SE)

( * ) Notice: Subject to any disclaimer, the term of this patent is extended or adjusted under 35 U.S.C. 154(b) by 261 days.

(21) Appl. No.: 18/689,938

(22) PCT Filed: Sep. 13, 2022

(86) PCT No.: PCT/SE2022/050805
§ 371 (c)(1),
(2) Date: Mar. 7, 2024

(87) PCT Pub. No.: WO2023/043357
PCT Pub. Date: Mar. 23, 2023

(65) Prior Publication Data

US 2025/0127183 A1 Apr. 24, 2025

(30) Foreign Application Priority Data

Sep. 16, 2021 (SE) .................................... 2151134-0

(51) Int. Cl.

| | |
|---|---|
| ***A23D 9/04*** | (2006.01) |
| ***A21D 13/28*** | (2017.01) |
| ***A21D 13/38*** | (2017.01) |
| ***A23G 1/30*** | (2006.01) |
| ***A23G 1/36*** | (2006.01) |
| ***A23G 3/34*** | (2006.01) |
| ***A23G 3/40*** | (2006.01) |

(52) U.S. Cl.
CPC ............... *A23D 9/04* (2013.01); *A21D 13/28* (2017.01); *A21D 13/38* (2017.01); *A23G 1/305* (2013.01); *A23G 1/36* (2013.01); *A23G 3/343* (2013.01); *A23G 3/40* (2013.01)

(58) Field of Classification Search
CPC ................ C11C 3/02; C11C 3/10; A23G 1/38
See application file for complete search history.

(56) References Cited

U.S. PATENT DOCUMENTS

| | | | | |
|---|---|---|---|---|
| 4,876,107 A * | 10/1989 | King | ........................ | C11C 3/08 426/607 |
| 6,277,433 B1 | 8/2001 | Lantz et al. | | |
| 2016/0183552 A1 | 6/2016 | Oonishi | | |

FOREIGN PATENT DOCUMENTS

| | | | |
|---|---|---|---|
| BE | 1024206 | A1 | 12/2017 |
| CN | 103561580 | A | 2/2014 |
| EP | 1 040 761 | A1 | 10/2000 |
| EP | 2 622 966 | A1 | 8/2013 |
| JP | 2015-173614 | A | 10/2015 |
| RU | 2791446 | C2 | 3/2023 |
| TW | 201517804 | A | 5/2015 |
| UA | 24461 | U | 6/2007 |
| WO | 2017042149 | A1 | 3/2017 |
| WO | WO 2018/149880 | A1 | 8/2018 |
| WO | WO 2019/020714 | | 1/2019 |

OTHER PUBLICATIONS

European search opinion for EP22870404 (Year: 2025).*
Minifie, "Chocolate, Cocoa, and Confectionary: Science and Technology," Third Edition, Chapters 3 and 19 (1989).
International Search Report for International Application No. PCT/SE2022/050805, dated Sep. 22, 2022 (4 pages).
Written Opinion of the International Searching Authority for International Application No. PCT/SE2022/050805 (6 pages).

* cited by examiner

*Primary Examiner* — Michele L Jacobson
(74) *Attorney, Agent, or Firm* — Finnegan, Henderson, Farabow, Garrett & Dunner LLP

(57) ABSTRACT

The invention relates to a milk fat replacer suitable for use in a chocolate or chocolate-like product, wherein the milk fat replacer comprises triglycerides, having the ability to mimic the functionality of milk fat in terms of its effects when used in chocolate or chocolate-like products. Further, the invention relates to a product comprising said milk fat replacer in addition to various use of said milk fat replacer.

29 Claims, No Drawings

MILK FAT REPLACER FOR CHOCOLATE OR CHOCOLATE-LIKE PRODUCTS

The present application is a national stage entry of PCT/SE2022/050805, filed Sep. 13, 2022, which claims priority to Swedish Application No. 2151134-0, filed Sep. 16, 2021. The entire contents of each application are hereby incorporated by reference.

TECHNICAL FIELD

The invention relates to a milk fat replacer suitable for use in a chocolate or chocolate-like product, wherein the milk fat replacer comprises triglycerides, having the ability to mimic the functionality of milk fat in terms of its effects when used in chocolate or chocolate-like products. Further, the invention relates to a product comprising said milk fat replacer in addition to various use of said milk fat replacer.

BACKGROUND ART

It is well known that the physical property of chocolate is influenced by the physical property of its fat phase composition. Further, milk fat is one of the few fats that has crystallization properties compatible with that of cocoa butter, such that in milk chocolate, co-crystallization of cocoa butter and milk fat triglycerides is a key factor affecting the physical properties and appearance of milk chocolate.

Addition of milk fat to chocolate retards the development of bloom during storage. It is therefore thought that milk fat inhibits the polymorphic transformation of cocoa butter to the most stable state, although the exact mechanisms of bloom formation are not clearly understood today. In general, the higher the milk fat level, the greater the level of bloom inhibition. Moreover, addition of milk fat causes a softening effect on cocoa butter, which results in softer chocolates. Thus, milk fat contributes to desirable texture and inhibits fat bloom in chocolate. However, a producer of chocolate might be interested in substituting some or all of the milk fat in a recipe, due to various reasons. One reason may be that dairy products contain high amount of saturated fatty acids, cholesterol, and calories, and therefore a complete or partial replacement of the milk fat with a vegetable fat alternative may assist in lowering the content of saturated fatty acids, hereby helping with the production of a healthier product.

If substituting milk fat in today's industry, one commonly used replacer of milk fat, which also contributes to soft texture of chocolate, is a middle fraction of palm oil (PMF). However, chocolates produced using a PMF as a milk fat replacer will develop bloom due to incompatibility of its triglyceride composition to those of cocoa butter.

There is therefore still a need within the field to provide a milk fat replacer, which is able to mimic the functionality of milk fat in terms of sensory attributes and bloom-stability, hereby assisting the producers in reducing raw material cost as well as production of healthier, dairy-free, lactose-free, and/or vegan chocolate products.

SUMMARY

It is an object of the present invention to provide a milk fat replacer, which has the ability to mimic the functionality of milk fat in terms of sensory attributes and bloom-stability; hence, the present invention relates to a milk fat replacer that can be used in chocolate or chocolate-like product to provide similar technical effects as addition of milk fat creates in the chocolate, i.e. softness (sensory) and bloom stability. From an industrial point of view, substitution (partly or in whole) of milk fat with the milk fat replacer of the present invention contributes to cost reduction and increased health profile of the finished product. In addition, using the milk fat replacer of the present invention it is possible to create dairy-free, lactose-free, and/or vegan chocolates with functionality attributes comparable to those of milk in the chocolate i.e. softness and bloom-stability.

The present invention relates to a milk fat replacer suitable for use in a chocolate or chocolate-like product, wherein the milk fat replacer comprises triglycerides of which: from 25% to 40% by weight is selected from SatOSat, SatSatO, or combinations thereof, from 18% to 35% by weight is selected from OSatO, SatOO, or combinations thereof, and from 15% to 25% by weight is selected from UUU, the ratio of SatSatO/SatOSat is in a range from 1.5 to 2.5, and the ratio of SatOO/OSatO is in a range from 1.5 to 2.5; and wherein, in said milk fat replacer the: sum of C6-C12 fatty acids is 15% or less by weight, sum of C16 fatty acids is from 7% to 30% by weight, and sum of saturated fatty acids (SAFA) is from 30% to 60% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

Some of the technical effects obtained by the present invention, as also shown in the corresponding examples is a milk fat replacer, which is able to provide both softening, bloom inhibition, and form-stability to the chocolate or chocolate-like product in which it is used.

A milk fat replacer may also be low-cost compared to a milk fat; hence, the milk fat replacer can also assist the producers in reducing the cost of a product while providing a healthier product (reduction in the high amount of saturated fatty acids, cholesterol, and calories). Even further, the obtained chocolate or chocolate-like product can be dairy-free, vegan, lactose-free, and/or plant-based.

In order words, by the present invention is provided a milk fat replacer, which is a cost-efficient alternative to milk fat for partial/full milk fat replacement in the recipe, may assist in promoting healthier chocolate products by substituting milk fat with a vegetable fat alternative with a lower amount of saturated fatty acids and a lower amount of trans fatty acids, be used in application in dairy-free, vegan chocolates suitable for conscious consumers, and still have a comparable functionality to that of milk fat i.e. providing sensory attributes and bloom stability, which is characteristic of a milk chocolate. All of this is provided by the milk fat replacer of the present invention.

Disclosed herein is also a milk fat replacer suitable for use in a chocolate or chocolate-like product, wherein the milk fat replacer comprises triglycerides of which: from 28% to 36% by weight is selected from SatOSat, SatSatO, or combinations thereof, from 23% to 30% by weight is selected from OSatO, SatOO, or combinations thereof, and from 15% to 22% by weight is selected from UUU, the ratio of SatSatO/SatOSat is in a range from 1.5 to 2.1, and the ratio of SatOO/OSatO is in a range from 1.5 to 2.1; and wherein, in said milk fat replacer the: sum of C6-C12 fatty acids is 5% or less by weight, sum of C16 fatty acids is from 10% to 17% by weight, and sum of saturated fatty acids (SAFA) is from 38% to 48% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

Further disclosed herein is a fat mixture comprising the milk fat replacer as disclosed herein, wherein the fat mixture further comprises a vegetable fat composition.

Further disclosed herein is a chocolate or chocolate-like product comprising from 1% to 20% by weight of the milk fat replacer as disclosed herein.

Disclosed herein is also the use of the milk fat replacer as disclosed herein in a chocolate- and/or a chocolate-like product.

Disclosed herein is further the use of a milk fat replacer as disclosed herein in a bakery product; a dairy product; a coating or enrobing product, such as a coating or enrobing product for bakery, confectionery, and/or moulding applications; a filling product, such as a bakery filling, a filling for a chocolate or chocolate-like product, or a confectionery filling product; or a chocolate or chocolate-like coating product.

Definitions

In the context of the present invention, the following terms are meant to comprise the following, unless defined elsewhere in the description.

As used herein, the term "vegetable" shall be understood as originating from a plant or a single cell organism. Thus, vegetable fat or vegetable triglycerides are still to be understood as vegetable fat or vegetable triglycerides if all the fatty acids used to obtain said triglyceride or fat is of plant or single cell organism origin.

Saturated fatty acids comprise of chains of carbon atoms joined by single bonds, with the maximum number of hydrogen atoms attached to each carbon atom in the chain. Unsaturated fatty acids comprise of chains of carbon atoms joined by single bonds and varying numbers of double bonds, which do not have their full quota of hydrogen atoms attached. An unsaturated fatty acid can exist in two forms, the cis form and the trans form. A double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond.

By using the nomenclature CX means that the fatty acid comprises X carbon atoms, e.g. a C14 fatty acid has 14 carbon atoms while a C8 fatty acid has 8 carbon atoms. By using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

As used herein, "%" or "percentage" relates to weight percentage i.e. wt. % or wt.-% if nothing else is indicated.

As used herein, "oil" and "fat" are used interchangeably, unless otherwise specified. As used herein, "vegetable oil" and "vegetable fat" are used interchangeably, unless otherwise specified.

By a chocolate or chocolate-like product is meant a product, which at least is experienced by the consumer as chocolate or as a confectionery product having sensorial attributes common with chocolate, such as e.g. melting profile, taste etc. Some chocolate comprises cocoa butter, typically in substantial amounts, where some chocolate-like product may be produced with a low amount of or even without cocoa butter, e.g. by replacing the cocoa butter with a cocoa butter equivalent, cocoa butter substitute, etc. In addition, many chocolate or chocolate-like products comprise cocoa powder or cocoa mass, although some chocolate or chocolate-like products, such as typical white chocolates, may be produced without cocoa powder, but e.g. drawing its chocolate taste from cocoa butter. Depending on the country and/or region there may be various restrictions on which products may be marketed as chocolate.

For products and methods in the confectionery areas, reference is made to "Chocolate, Cocoa and Confectionery", B. W. Minifie, Aspen Publishers Inc., 3. Edition 1999.

The term "comprising" or "to comprise" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

As used herein, the term "triglycerides" may be used interchangeably with the term "triacylglycerides" and should be understood as an ester derived from glycerol and three fatty acids. "Triglycerides" may be abbreviated TG or TAG.

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and that below becomes C-3. The prefix 'sn' is placed before the stem name of the compound.

Sn1/sn2/sn3

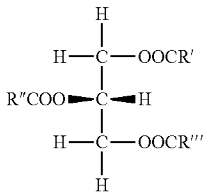

position sn-1
position sn-2
position sn-3.

Fischer projection of a natural L-glycerol derivative

By randomly distributed is meant that the fatty acids is randomly distributed to the three sn-positions. A randomly distributed composition may be obtained by means of esterification, chemical transesterification or enzymatic transesterification. All naturally occurring fat compositions, e.g. virgin olive oil, palm kernel oil, coconut oil or rapeseed oil all have a non-randomly distribution of the fatty acids on the glycerol backbone.

The sum of a given component in the milk fat replacer can never be more than 100% by weight, e.g. the sum of all the fatty acid in the milk fat replacer can never be more than 100% by weight.

Palmitic acid (P) is a saturated fatty acid with 16 carbon atoms (C16:0); Stearic acid (St) is a saturated fatty acid with 18 carbon atoms (C18:0); Oleic acid (O) is a monounsaturated fatty acid with 18 carbon atoms and a cis double bound (C18:1); Linoleic acid (Li) is a polyunsaturated fatty acid with 18 carbon atoms and two cis double bounds (C18:2); and Linolenic acid (Le) is a polyunsaturated fatty acid with 18 carbon atoms and three cis double bounds (C18:3).

As used herein "cocoa butter replacer" or CBR is intended to mean an edible fat having a triglyceride composition significantly different to cocoa butter. Cocoa butter replacers can have from high to low and even no trans fatty acids in its triglyceride composition. Cocoa butter replacers are only mixable with cocoa butter in medium to small ratios. Furthermore, in contrast to chocolate, cocoa butter replacer based compounds do not need to undergo a treatment at different temperatures, known as tempering, prior to molding, coating, or enrobing, in order to obtain a final product with acceptable shelf life.

As used herein "cocoa butter equivalent" or CBE is intended to mean an edible fat having very similar chemical and physical properties and being compatible with cocoa butter. In both cocoa butter and cocoa butter equivalent, the main fatty acids are typically palmitic, stearic, and oleic acids. The triglycerides are typically 2-oleo di-saturated (SatOSat (Sat2O)). In spite of their similarity to cocoa butter, cocoa butter equivalents can be detected in chocolate by their triglyceride ratios, which are appreciably different from those in cocoa butter. Cocoa butter equivalents are e.g. made from a mix of palm mid fraction and a fractionated part of shea stearin or another oil fraction rich in SatOSat triglycerides, where Sat is a saturated fatty acid having a chain length of C16 or longer, such as C16 and C18.

A CBE can further be sub-classed into a "cocoa butter improver" or CBI, which is a harder version (i.e. has a higher solid fat content) of cocoa butter equivalent due to a higher content of high melting SatOSat triglycerides such as StOSt triglycerides and/or StOA triglycerides (where A is arachidic acid, C20:0). It is usually used in chocolate formulations having a high content of milk fat or those meant for tropical climates. It improves the heat stability of soft cocoa butter varieties, adds more solid fat, and thereby increases hardness in chocolate products.

As used herein "cocoa butter substitute" or CBS is intended to mean an edible fat having a triglyceride composition very different to cocoa butter. Most cocoa butter substitutes are based on lauric fats, i.e. fats that contain a high amount of lauric acids in their fatty acid composition. Cocoa butter substitutes are only mixable with cocoa butter in small ratios. Furthermore, cocoa butter substitutes are non-temper fat compositions so in contrast to chocolate, cocoa butter substitute based compounds do not need to undergo a treatment at different temperatures, known as tempering, prior to molding, coating, or enrobing, in order to obtain a final product with acceptable form stability and/or shelf life.

Fractionation is the process to get several fractions of different melting points, hardness, and solid fat content from solid or semisolid oils and fats, thus makes it possible to extend the application of edible oils and fats in the related food products. During a two-stage fractionation, oil/fat is separated into a higher melting point stearin fraction and a lower melting point olein fraction. The olein fraction obtained by the first stage fractionation is then separated into a fraction called a super olein and a middle melting point fraction Softness in this application is a feature of chocolate or chocolate-like product that is related to texture at a certain temperature and thus the lower texture the chocolate or chocolate-like product has at a certain temperature, the softer it is. This may also be understood and experienced by a consumer as the easiness of taking a bite of the product, where the softer the product, the easier it is to bite a piece off said product.

By a form-stable chocolate is referred to the ability of the chocolate or chocolate-like bars, tablets, etc. to retain its shape at elevated temperatures for a predefined period. By retaining its shape is meant that the chocolate bar/tablet has retained a more square form and is less flattened at the edges.

Bloom stability or bloom resistance refers in this context to a property of the chocolate to resist bloom formation and maintaining a high gloss of the chocolate or the chocolate-like product. Increased or improved bloom stability/resistance in a chocolate or chocolate-like product in the present context thus implies that the chocolate or chocolate-like product has a higher resistance towards blooming, which can be observed as a white/grey fat layer on the surface of said product.

DETAILED DESCRIPTION

The present invention relates to a milk fat replacer suitable for use in a chocolate or chocolate-like product, wherein the milk fat replacer comprises triglycerides of which: from 25% to 40% by weight is selected from SatOSat, SatSatO, or combinations thereof, from 18% to 35% by weight is selected from OSatO, SatOO, or combinations thereof, and from 15% to 25% by weight is selected from UUU, the ratio of SatSatO/SatOSat is in a range from 1.5 to 2.5, and the ratio of SatOO/OSatO is in a range from 1.5 to 2.5; and wherein, in said milk fat replacer the: sum of C6-C12 fatty acids is 15% or less by weight, sum of C16 fatty acids is from 7% to 30% by weight, and sum of saturated fatty acids (SAFA) is from 30% to 60% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

One of the advantages of the present invention is that it provides a cost-efficient alternative to milk fat for partial/full milk fat replacement in the recipe. In this way, the producer is able to cut cost when producing a chocolate or chocolate-like product where milk fat has previously been needed in the recipe.

Further, such product as obtained using the milk fat replacer disclosed herein can provide the producer the option of producing the product dairy-free. The producer may thereby also be able to obtain a product that can be marketed as lactose-free and vegan and/or plant-based if wanted, which may be a chocolate or chocolate-like product suitable for conscious consumers.

Another advantage of the present invention is that the milk fat replacer can assist the producer in providing a healthier chocolate or chocolate-like product by substituting milk fat with a vegetable fat composition lower in saturated fatty acids and trans-unsaturated fatty acids. This will provide a vegetable fat alternative to the traditionally used milk fat recipes.

All of the above advantages of the milk fat replacer are obtained while still maintaining a comparable functionality of the milk fat replacer when compared to that of milk fat. This means that the milk fat replacer also provides the sensory attributes and bloom stability, which is characteristic of a milk chocolate or chocolate-like product.

In one or more embodiments, the sum of C6-C12 fatty acids is 10% by weight or less, such as 5% by weight or less, such as 2% by weight or less, or such as less than 0.1% by weight. In one or more embodiments, the sum of C6-C12 fatty acids is less than 0.01% by weight.

In one or more embodiments, the sum of C16 fatty acids is from 10% to 25% by weight, such as from 10% to 17% by weight.

In one or more embodiments, the sum of saturated fatty acids is from 35% to 50% by weight, such as from 38% to 48% by weight, or such as from 39% to 45% by weight.

In one or more embodiments, from 28% to 36% by weight is selected from SatOSat, SatSatO, or combinations thereof, such as from 30% to 35% by weight.

In one or more embodiments, the ratio of SatSatO/SatOSat is in a range from 1.5 to 2.25, such as in a range from 1.75 to 2.25, such as in a range from 1.75 to 2.1, or wherein the ratio of SatSatO/SatOSat is in a range from 1.5 to 2.1. By the ratio of SatSatO/SatOSat is meant that the total amount of SatSatO triglycerides is divided by the total amount of SatOSat triglycerides, where Sat is a saturated fatty acid selected from St (stearic acid), P (palmitic acid), or combinations thereof and O is oleic acid.

In one or more embodiments, from 20% to 30% is selected from OSatO, SatOO, or combinations thereof, such as from 23% to 30% by weight.

In one or more embodiments, the ratio of SatOO/OSatO is in a range from 1.5 to 2.25, such as in a range from 1.75 to 2.25, such as in a range from 1.75 to 2.1, or wherein the ratio of SatOO/OSatO is in a range from 1.5 to 2.1. By the ratio of SatOO/OSatO is meant that the total amount of SatOO triglycerides is divided by the total amount of OSatO triglycerides, where Sat is a saturated fatty acid selected from St (stearic acid), P (palmitic acid), or combinations thereof and O is oleic acid.

In one or more embodiments, from 15% to 22% by weight is selected from UUU.

In one or more embodiments, the milk fat replacer comprises shea oil and/or fractions hereof, palm oil and/or fractions hereof, or combinations thereof.

In one or more embodiments, the milk fat replacer consist of shea oil, palm oil, a blend thereof, and/or fractions thereof.

In one or more embodiments, the triglycerides in the milk fat replacer comprises randomly distributed fatty acids.

In one or more embodiments, the milk fat replacer consist of randomly interesterified vegetable oil parts. In one or more embodiments, the randomly distributed fatty acids in the milk fat replacer is obtained by an interesterification or a transesterification of vegetable oil parts, such as a chemically interesterification of vegetable oil parts.

In one or more embodiments, the milk fat replacer comprises at least 50% by weight of randomly interesterified shea olein. In one or more embodiments, the milk fat replacer comprises at least 55% by weight of randomly interesterified shea olein. In one or more embodiments, the milk fat replacer comprises at least 60% by weight of randomly interesterified shea olein. In one or more embodiments, the milk fat replacer comprises 60% by weight of randomly interesterified shea olein.

In one or more embodiments, the milk fat replacer comprises from 30 to 50% by weight of a middle fraction of randomly interesterified fat blend based on palm and shea fractions. In one or more embodiments, the milk fat replacer comprises from 35 to 45% by weight of a middle fraction of randomly interesterified fat blend based on palm and shea fractions. In one or more embodiments, the milk fat replacer comprises 40% by weight of a mid-fraction of randomly interesterified fat blend based on palm and shea fractions.

In one or more embodiments, the middle fraction of randomly interesterified fat blend based on palm and shea fractions is obtained from palm oil, palm oil fractions, shea oil, shea oil fractions, or combinations thereof.

In one or more embodiments, the middle fraction of randomly interesterified fat blend based on palm and shea fractions comprises triglycerides of which: from 10% to 16% by weight is selected from StOSt, from 23% to 29% by weight is selected from POSt, from 12% to 18% by weight is selected from POP, from 51% to 57% by weight is selected from SatOSat, SatSatO, or combinations thereof, and from 17% to 23% by weight is selected from OSatO, SatOO, or combinations thereof, the ratio of SatSatO/SatOSat is in a range from 1.8 to 2.2, and the ratio of SatOO/OSatO is in a range from 1.8 to 2.2; wherein Sat is a saturated fatty acid selected from St (stearic acid), P (palmitic acid), or combinations thereof.

In one or more embodiments, the milk fat replacer comprises 60% by weight of randomly interesterified shea olein and 40% by weight of a middle fraction of randomly interesterified fat blend based on palm and shea fractions. In one or more embodiments, the milk fat replacer comprises 65% by weight of randomly interesterified shea olein and 35% by weight of a middle fraction of randomly interesterified fat blend based on palm and shea fractions. In one or more embodiments, the milk fat replacer comprises 70% by weight of randomly interesterified shea olein and 30% by weight of a middle fraction of randomly interesterified fat blend based on palm and shea fractions. In one or more embodiments, the milk fat replacer comprises 60% by weight of randomly interesterified shea olein and 40% by weight of a middle fraction of randomly interesterified fat blend based on palm and shea fractions. In one or more embodiments, the milk fat replacer comprises 55% by weight of randomly interesterified shea olein and 45% by weight of a middle fraction of randomly interesterified fat blend based on palm and shea fractions. In one or more embodiments, the milk fat replacer comprises 50% by weight of randomly interesterified shea olein and 50% by weight of a middle fraction of randomly interesterified fat blend based on palm and shea fractions. In one or more embodiments, the milk fat replacer comprises from 50% to 70% by weight of randomly interesterified shea olein and from 30% to 50% by weight of a middle fraction of randomly interesterified fat blend based on palm and shea fractions.

The present invention further relates to a fat mixture comprising the milk fat replacer as disclosed herein, wherein the fat mixture further comprises a vegetable fat composition.

Disclosed herein is a fat mixture comprising a milk fat replacer and a vegetable fat composition, wherein the milk fat replacer comprises triglycerides of which: from 25% to 40% by weight is selected from SatOSat, SatSatO, or combinations thereof, from 18% to 35% by weight is selected from OSatO, SatOO, or combinations thereof, and from 15% to 25% by weight is selected from UUU, the ratio of SatSatO/SatOSat is in a range from 1.5 to 2.5, and the ratio of SatOO/OSatO is in a range from 1.5 to 2.5; and wherein, in said milk fat replacer the: sum of C6-C12 fatty acids is 15% or less by weight, sum of C16 fatty acids is from 7% to 30% by weight, and sum of saturated fatty acids (SAFA) is from 30% to 60% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

In one or more embodiments, the fat composition comprising from 1% to 10% by weight of the milk fat replacer. In one or more embodiments, the fat composition comprising from 1% to 10% by weight of the milk fat replacer, and from 90% to 99% by weight of the vegetable fat composition.

In one or more embodiments, the fat composition comprising from 3% to 5% by weight of the milk fat replacer. In one or more embodiments, the fat composition comprising from 3% to 5% by weight of the milk fat replacer, and from 95% to 97% by weight of the vegetable fat composition.

In one or more embodiments, the vegetable fat composition is selected from a cocoa butter equivalent (CBE), a cocoa butter replacer (CBR), a cocoa butter substitute (CBS), or combinations thereof.

In one or more embodiments, the vegetable fat composition is originating from naturally occurring vegetable fats. In one or more embodiments, the vegetable fat composition is selected from palm oil, palm kernel oil, shea oil, Illipe butter, kokum butter, mango kernel stearin, sal stearin, coconut oil, soybean oil, rapeseed oil, high lauric rapeseed oil, cottonseed oil, safflower oil, sunflower oil, high oleic sunflower oil, rice oil, corn oil, sesame oil, olive oil, a blend thereof, and/or fractions thereof.

The above-mentioned oils may also be used as a component where such oil is present in a processed version of said oil, such as a hydrogenated version and/or a chemical or enzymatic interesterified version of said oil. An example could be a hydrogenated palm kernel oil or a fractionated and interesterified shea oil.

In one or more embodiments, the vegetable fat composition is selected from palm kernel oil, coconut oil, high lauric rapeseed oil, coconut oil, shea oil, or a blend thereof, and/or fractions thereof, or an interesterified, and/or hydrogenated version of palm kernel oil, coconut oil, high lauric rapeseed oil, coconut oil, shea oil, or a blend thereof, and/or fractions thereof.

The present invention further relates to a chocolate or chocolate-like product comprising from 1% to 20% by weight of the milk fat replacer as disclosed herein.

Disclosed herein is a chocolate or chocolate-like product comprising from 1% to 20% by weight of a milk fat replacer wherein the milk fat replacer comprises triglycerides of which: from 25% to 40% by weight is selected from SatOSat, SatSatO, or combinations thereof, from 18% to 35% by weight is selected from OSatO, SatOO, or combinations thereof, and from 15% to 25% by weight is selected from UUU, the ratio of SatSatO/SatOSat is in a range from 1.5 to 2.5, and the ratio of SatOO/OSatO is in a range from 1.5 to 2.5; and wherein, in said milk fat replacer the: sum of C6-C12 fatty acids is 15% or less by weight, sum of C16 fatty acids is from 7% to 30% by weight, and sum of saturated fatty acids (SAFA) is from 30% to 60% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

In one or more embodiments, the chocolate or chocolate-like product is dairy-free, lactose-free, plant-based, and/or vegan.

In one or more embodiments, the chocolate or chocolate-like product further comprises other fats selected from cocoa butter equivalents (CBE) and/or cocoa butter.

In one or more embodiments, the chocolate or chocolate-like product is form-stable at temperatures above 25° C. In one or more embodiments, the chocolate or chocolate-like product is form-stable at temperatures above 25° C. for at least 5 days, such as at least 7 days, such as at least 10 days.

In one or more embodiments, the chocolate or chocolate-like product is form-stable at temperatures above 31° C. for at least 5 days, such as at least 7 days, such as at least 10 days.

In one or more embodiments, the chocolate or chocolate-like product is form-stable at temperatures above 34° C. for at least 5 days, such as at least 7 days, such as at least 10 days.

The present invention further relates to the use of the milk fat replacer as disclosed herein in a chocolate- and/or a chocolate-like product.

Disclosed herein is the use of a milk fat replacer in a chocolate- and/or a chocolate-like product, wherein the milk fat replacer comprises triglycerides of which: from 25% to 40% by weight is selected from SatOSat, SatSatO, or combinations thereof, from 18% to 35% by weight is selected from OSatO, SatOO, or combinations thereof, and from 15% to 25% by weight is selected from UUU, the ratio of SatSatO/SatOSat is in a range from 1.5 to 2.5, and the ratio of SatOO/OSatO is in a range from 1.5 to 2.5; and wherein, in said milk fat replacer the: sum of C6-C12 fatty acids is 15% or less by weight, sum of C16 fatty acids is from 7% to 30% by weight, and sum of saturated fatty acids (SAFA) is from 30% to 60% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

Disclosed herein is the use of a milk fat replacer as disclosed herein in a bakery product; a dairy product; a coating or enrobing product, such as a coating or enrobing product for bakery, confectionery, and/or moulding applications; a filling product, such as a bakery filling or a confectionery filling product, a filling for a chocolate or chocolate-like product; or a chocolate or chocolate-like coating product.

Disclosed herein is the use of a milk fat replacer in a bakery product; a dairy product; a coating or enrobing product, such as a coating or enrobing product for bakery, confectionery, and/or moulding applications; a filling product, such as a bakery filling or a confectionery filling product, a filling for a chocolate or chocolate-like product; or a chocolate or chocolate-like coating product, wherein the milk fat replacer comprises triglycerides of which: from 25% to 40% by weight is selected from SatOSat, SatSatO, or combinations thereof, from 18% to 35% by weight is selected from OSatO, SatOO, or combinations thereof, and from 15% to 25% by weight is selected from UUU, the ratio of SatSatO/SatOSat is in a range from 1.5 to 2.5, and the ratio of SatOO/OSatO is in a range from 1.5 to 2.5; and wherein, in said milk fat replacer the: sum of C6-C12 fatty acids is 15% or less by weight, sum of C16 fatty acids is from 7% to 30% by weight, and sum of saturated fatty acids (SAFA) is from 30% to 60% by weight; and wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The present invention is further illustrated by the following examples, which are not to be construed as limiting the scope of protection. The features disclosed in the foregoing description and in the following examples may, both separately or in any combination thereof, be material for realising the invention in diverse forms thereof.

EXAMPLES

Example 1

Specifications of an exemplified milk fat replacer of the present invention (denoted Fat A) and the reference fat (denoted Fat B) are summarized in the table below (table 1). Fat A consists of 60% randomly interesterified shea olein and 40% of a middle fraction of randomly interesterified fat blend based on palm and shea fractions. Fat B consists of 100% palm mid-fraction IV 45.

TABLE 1

| | Fat A | Fat B |
|---|---|---|
| **Fatty acid composition** | | |
| Myristic acid (C14:0)/wt. % | 0.2 | 0.9 |
| Palmitic acid (C16:0)/wt. % | 13.7 | 48.5 |
| Stearic acid (C18:0)/wt. % | 27.4 | 5.2 |
| Oleic acid (C18:1 cis)/wt. % | 48.8 | 37.1 |
| Elaidic acid (C18:1 trans)/wt. % | 0.3 | 0.1 |
| Linoleic acid (C18:2 cis)/wt. % | 7.4 | 6.7 |
| Linoelaidic acid (C18:2 trans)/wt. % | — | 0.2 |
| Linolenic acid (C18:3 cis)/wt. % | 0.2 | 0.1 |
| Saturated fatty acids (SAFA)/wt. % | 42.5 | 55.3 |
| **Triglyceride composition *** | | |
| LiOO/wt. % | 5.6 | 0.9 |
| PLiO/wt. % | 2 | 5.3 |
| PLiP/wt. % | 1 | 7.6 |
| MOP/wt. % | 0.2 | 2 |
| OOO/wt. % | 12.4 | 2.7 |
| StLiO/wt. % | 6.3 | 0.6 |
| POO/wt. % | 6.2 | 13.6 |
| PLiSt/wt. % | 2.1 | 1.5 |
| POP/wt. % | 6.7 | 48.2 |
| PPP/wt. % | 0.9 | 1.6 |
| StOO/wt. % | 20.1 | 1.5 |
| StLiSt/wt. % | 2.3 | 0.1 |
| POSt/wt. % | 12.5 | 9.8 |
| StOSt/wt. % | 13.3 | 1.2 |
| Sum of SatSatO and SatOSat/wt. % ** | 32.5 | 59.2 |
| Ratio SatSatO/SatOSat ** | 2 | 0.11 |
| Sum of SatOO and OSatO/wt. % ** | 26.3 | 15.1 |
| Ratio SatOO/OSatO ** | 2 | — |
| UUU/wt. % | 18.3 | 3.6 |

* where Li is linoleic acid, O is oleic acid, P is palmitic acid, M is myristic acid, and St is stearic acid;
** where Sat is only calculated from a saturated fatty acid selected from St, P, or combinations thereof;
*** where UUU is only the sum of triglycerides from LiLiLi, LiLiO, LeOO, LiOO, and OOO, where Le is linolenic acid The fatty acid compositions of the fat compositions were analysed using IUPAC 2.301 (Methylation) and IUPAC 2.304 (GLC). The amount of a triglyceride (TAG) is determined using the AOCS Ce 5b-89 method, which is a standard method for determining triglycerides in vegetable oils by HPLC.

Example 2

In this example, both dark and milk chocolates were prepared using fat A, fat B, and fat C (which is a milk fat). The dark and milk chocolates were prepared according to the following recipes (table 2 and table 3). All ingredients mentioned in the recipe except flavour, lecithin, and some of the fat were mixed using a Hobart N-50 mixer at 55° C. for 10 minutes for milk chocolate and at 65° C. for 10 minutes for dark chocolate. They were then refined using a Bühler SDY-300 three-roll refiner (with 300 mm width) to a particle size of 20 microns. The refined product was added to the Hobart mixer bowl and conched for 6 hours at 55° C. for milk chocolate and for 6 hours at 65° C. for dark chocolate. After conching for 5.5 hours, the lecithin was added and after 5.75 hours, the rest of the fat was added and conching were continued. When 5 minutes remained of the total conching time, vanillin was added and conching continued for the remaining 5 minutes. Chocolates were hand-tempered to ensure a slope within ±0.25/Temper Index 5.0±1.0. The chocolate were used for making 50 g chocolate tablets, which were subsequently cooled in a three-zone cooling tunnel with temperatures of 15° C., 12° C., and 15° C., respectively, for 30 minutes.

TABLE 2

| | Dark chocolate I | Dark chocolate II (Comparative) | Dark chocolate III (Comparative) |
|---|---|---|---|
| **Dark chocolate recipe** | | | |
| Fat A/wt. % (a milk fat replacer of the present invention) | 4.00 | — | — |
| Fat B/wt. % (PMF IV 45) | — | 4.00 | — |
| Fat C/wt. % (Milk fat) | — | — | 4.00 |
| Sugar/wt. % | 44.84 | 44.84 | 44.84 |
| Cocoa mass/wt. % | 39.00 | 39.00 | 39.00 |
| Cocoa powder/wt. % | 4.33 | 4.33 | 4.33 |
| Cocoa butter/wt. % | 7.41 | 7.41 | 7.41 |
| Lecithin/wt. % | 0.40 | 0.40 | 0.40 |
| Vanillin/wt. % | 0.02 | 0.02 | 0.02 |
| Total/wt. % | 100 | 100 | 100 |
| Fat content in the recipe/wt. % | 33.73 | 33.73 | 33.73 |
| **Fat composition** | | | |
| Cocoa butter/wt. % | 88.14 | 88.14 | 88.14 |
| Vegetable fat/wt. % | 11.86 | 11.86 | — |
| Milk fat/wt. % | — | — | 11.86 |
| Total/wt. % | 100 | 100 | 100 |

TABLE 3

| | Milk chocolate I | Milk chocolate II (Comparative) | Milk chocolate III (Comparative) |
|---|---|---|---|
| **Milk chocolate recipe** | | | |
| Fat A/wt. % (a milk fat replacer of the present invention) | 5.00 | — | — |
| Fat B/wt. % (PMF IV 45) | — | 5.00 | — |
| Fat C/wt. % (Milk fat) | — | — | 5.00 |
| Sugar/wt. % | 46.08 | 46.08 | 46.08 |
| Cocoa mass/wt. % | 13.50 | 13.50 | 13.50 |
| Skim milk powder/wt. % | 15.00 | 15.00 | 15.00 |
| Cocoa butter/wt. % | 20.00 | 20.00 | 20.00 |
| Lecithin/wt. % | 0.40 | 0.40 | 0.40 |
| Vanillin/wt. % | 0.02 | 0.02 | 0.02 |
| Total/wt. % | 100 | 100 | 100 |
| Fat content in the recipe/wt. % | 32.71 | 32.71 | 32.71 |

TABLE 3-continued

| | Milk chocolate I | Milk chocolate II (Comparative) | Milk chocolate III (Comparative) |
|---|---|---|---|
| | Fat composition | | |
| Cocoa butter/wt. % | 84.26 | 84.26 | 84.26 |
| Vegetable fat/wt. % | 15.74 | 15.74 | — |
| Milk fat/wt. % | — | — | 15.74 |
| Total/wt. % | 100 | 100 | 100 |

Example 3

Chocolate tablets produced according to example 2 were stored for a minimum of 7 days at 20° C. before being measured for hardness using a TAX2 Plus texture analyzer using a P2 Needle and 3 mm penetration depth into the product. The tablets were penetrated until a standard deviation of below 5% was obtained (typically needed eight penetrations). The hardness/texture was also measured at 27° C. For these measurements, after the initial 7 days of storage at 20° C., samples were transferred into a 27° C. cabinet for 24 hours+/−1 hour before texture measurement. Texture measurements are shown below in table 4 and values are shown in g (force) measured.

TABLE 4

| | Texture/g (force) at 20° C. | Texture/g (force) at 27° C. |
|---|---|---|
| Dark chocolate I | 692 | 317 |
| Dark chocolate II | 788 | 415 |
| Dark chocolate III | 600 | 227 |
| Milk chocolate I | 531 | 197 |
| Milk chocolate II | 682 | 292 |
| Milk chocolate III | 534 | 168 |

Dark chocolate I comprising a milk fat replacer according to the present invention had a texture at 20° C. and 27° C., which were closer to a dark chocolate comprising actual milk fat (dark chocolate III) when compared to a dark chocolate comprising a PMF as a replacer (dark chocolate II). Thus, dark chocolate I, had a softness closer to that of dark chocolate III at both 20° C. and 27° C.

In a milk chocolate formula, the Fat A (Milk chocolate I), which consists of a milk fat replacer according to the present invention was also here able to create a texture, which was comparable to that of milk fat (Milk chocolate III) at both 20° C. and 27° C. whilst Fat B (Milk chocolate II) created significantly higher texture (harder tablets/more force needed to penetrate). Thus, milk chocolate I, had a similar softness similar to that of milk chocolate III at both 20° C. and 27° C.

Example 4

The chocolate tablets produced according to example 2 were stored for minimum of 3 days at 20° C. before being moved to a cabinet with a temperature that can cycle between 25° C., 31° C., and 20° C. Cycling took place between 25° C. and 31° C. with 12 hours' time interval. Every time samples went through 12 hours at 25° C. and 12 hours at 31° C., one cycle was completed. When a cycle included an evaluation period said cycle also included an intermittent storage at 20° C. for 6 hours at the end of said cycle. Evaluations were performed as shown in the table below (table 5).

Bloom evaluation was performed after 5 hours at 20° C. and are summarized in table 5 below. Three replications were made for each chocolate sample, which resulted in three bloom evaluations as shown in the table. Bloom evaluations were made according to a scale from 1-10. Character 1 signifies heavy bloom and no gloss whereas character 10 signifies no bloom and high gloss. Character 4 marks the onset of a very weak bloom, and character 3 is substantial amount of bloom.

TABLE 5

| Cycles | Dark chocolate I | Dark chocolate II | Dark chocolate III |
|---|---|---|---|
| 0 | 8, 8, 8 | 8, 8, 8 | 8, 8, 8 |
| 2 | 8, 8, 8 | 8, 8, 8 | 8, 8, 8 |
| 5 | 7, 7, 7 | 4, 7, 7 | 7, 7, 7 |
| 7 | 7, 7, 7 | 4, 6, 6 | 7, 7, 7 |
| 12 | 7, 7, 7 | 2, 2, 2 | 7, 7, 7 |
| 14 | 7, 7, 7 | 1, 1, 1 | 7, 7, 7 |
| 19 | 5, 5, 5 | 1, 1, 1 | 5, 5, 5 |
| 21 | 5, 5, 5 | 1, 1, 1 | 5, 5, 5 |
| 26 | 3, 3, 3 | 1, 1, 1 | 3, 3, 3 |
| | Milk chocolate I | Milk chocolate II | Milk chocolate III |
| 0 | 8, 8, 8 | 8, 8, 8 | 8, 8, 8 |
| 2 | 8, 8, 8 | 8, 8, 8 | 8, 8, 8 |
| 5 | 7, 7, 7 | 4, 7, 7 | 7, 7, 7 |
| 7 | 7, 7, 7 | 4, 4, 6 | 7, 7, 7 |
| 12 | 7, 7, 7 | 1, 1, 1 | 7, 7, 7 |
| 14 | 7, 7, 7 | 1, 1, 1 | 7, 7, 7 |
| 19 | 6, 6, 6 | 1, 1, 1 | 6, 6, 6 |
| 21 | 6, 6, 6 | 1, 1, 1 | 5, 5, 5 |
| 26 | 5, 5, 5 | 1, 1, 1 | 5, 5, 5 |
| 47 | 5, 5, 5 | 1, 1, 1 | 4, 4, 4 |
| 51 | 3, 3, 3 | 1, 1, 1 | 3, 3, 3 |

Results showed that the dark and milk chocolates comprising a milk fat replacer according to the present invention (dark- and milk chocolate I) had similar bloom-stability to the chocolates made with milk fat (dark- and milk chocolate III) at a temperature cycling between 25-31° C., whilst chocolates made with a PMF fraction (dark- and milk chocolate II) instead had notably shorter bloom-stability with onset of a very weak bloom already after 5 cycles.

Example 5

The chocolate tablets produced according to example 2 were stored for minimum of 3 days at 20° C. before being moved to a cabinet with a temperature that can cycle between 25° C., 34° C., and 20° C. Cycling took place between 25° C. and 34° C. with 12 hours' time interval. Every time samples went through 12 hours at 25° C. and 12 hours at 34° C., one cycle was completed. When a cycle included an evaluation period said cycle also included an intermittent storage at 20° C. for 6 hours at the end of said cycle. Evaluations were performed as shown in the table below (table 6). Bloom evaluation was performed after 5 hours at 20° C. and are summarized in table 6 below. Three replications were made of each chocolate sample, which resulted in three bloom evaluations as shown in the table below.

TABLE 6

| Cycles | Dark chocolate I | Dark chocolate II | Dark chocolate III |
|---|---|---|---|
| 0 | 8, 8, 8 | 8, 8, 8 | 8, 8, 8 |
| 3 | 7, 7, 7 | 4, 4, 4 | 7, 7, 7 |
| 5 | 4, 4, 4 | 2, 2, 2 | 3, 3, 3 |
| 10 | 3, 3, 3 | 1, 1, 1 | 2, 2, 2 |
| 12 | 3, 3, 3 | 1, 1, 1 | 3, 3, 3 |
| 17 | 1, 1, 1 | 1, 1, 1 | 1, 1, 1 |
| | Milk chocolate I | Milk chocolate II | Milk chocolate III |
| 0 | 8, 8, 8 | 8, 8, 8 | 8, 8, 8 |
| 3 | 5, 5, 5 | 2, 2, 2 | 5, 5, 5 |
| 5 | 5, 5, 5 | 1, 1, 1 | 4, 4, 4 |
| 10 | 4, 4, 4 | 1, 1, 1 | 3, 3, 3 |
| 12 | 4, 4, 4 | 1, 1, 1 | 3, 3, 3 |
| 17 | 1, 1, 1 | 1, 1, 1 | 1, 1, 1 |

Results again showed that the dark and milk chocolates I, made with a milk fat replacer according to the present invention had bloom stability comparable to dark and milk chocolates III made with milk fat upon storage at a temperature cycling between 25-34° C. However, dark and milk chocolates II made with fat B had notably shorter bloom stability already occurring after 3 cycles.

Example 6

Dark and milk chocolates of example 5 were also evaluated for form-stability after 5 cycles. Table 7 below summarizes the comparison. Samples were rated according to a scale from 1 to 5, wherein 1 is poor form stability and 5 is good form stability.

TABLE 7

| | I | II | III |
|---|---|---|---|
| Dark chocolate | 5 | 3 | 4 |
| Milk chocolate | 3 | 1 | 1 |

Analysing the above comparison, it is worth noting that both dark and milk chocolates made using a milk fat replacer according to the present invention (dark- and milk chocolate I) had form-stability, which was superior to those made with milk fat (dark- and milk chocolate III) or fat B (dark- and milk chocolate II).

Example 7

Chocolates IV, V and VI were all made using a standard cocoa butter equivalent (CBE) (at the time of the making the examples an AAK commercial CBE, Illexao™ SC 70, was used) as the vegetable fat composition based on shea and palm. Whilst chocolate IV was comprised of 100% CBE as the vegetable fat composition, chocolates V and VI were produced by exchanging 3% of the CBE in the recipe with 3% milk fat replacer of the present invention (fat A) and 3% milk fat (fat C), respectively. Chocolate IV and V are milk-free i.e. vegan. All ingredients except flavour, lecithin, and some of the fat were mixed using a Hobart N-50 mixer at 55° C. for 10 minutes. They were then refined using a Buhler SDY-300 three-roll refiner (with 300 mm width) to a particle size of 20 microns. The refined product was added to the Hobart mixer bowl and conched for 6 hours at 55° C. After conching for 5.5 hours, the lecithin was added and after 5.75 hours, the rest of the fat was added and conching were continued. When 5 minutes remained of the total conching time, vanillin was added and conching continued for the remaining 5 minutes. Chocolates were hand-tempered to ensure a slope within ±0.25/Temper Index 5.0±1.0. The chocolate were used for making 50 g chocolate tablets, which were subsequently cooled in a three-zone cooling tunnel with temperatures of 15° C., 12° C., and 15° C., respectively, for 30 minutes.

TABLE 8

| | Chocolate IV | Chocolate V | Chocolate VI |
|---|---|---|---|
| Chocolate recipe | | | |
| Fat A/wt. % (a milk fat replacer of the present invention) | — | 3.00 | — |
| Vegetable fat (CBE)/wt. % | 28.00 | 25.00 | 25.00 |
| Fat C/wt. % (Milk fat) | — | — | 3.00 |
| Sugar/wt. % | 39.58 | 39.58 | 39.58 |
| Cocoa mass/wt. % | 14.00 | 14.00 | 14.00 |
| Lecithin/wt. % | 0.40 | 0.40 | 0.40 |
| Vanillin/wt. % | 0.02 | 0.02 | 0.02 |
| Sweet rice flour/wt. % | 18.00 | 18.00 | 18.00 |
| Total/wt. % | 100 | 100 | 100 |
| Fat content in the recipe/wt. % | 35.84 | 35.84 | 35.84 |
| Fat composition | | | |
| Cocoa butter/wt. % | 21.88 | 21.88 | 21.88 |
| Vegetable fat/wt. % | 78.21 | 78.21 | 69.75 |
| Milk fat/wt. % | — | — | 8.37 |
| Total/wt. % | 100 | 100 | 100 |

Example 8

Chocolates IV, V, and VI made according to example 7 were evaluated for texture and bloom stability. Chocolate tablets were stored for a minimum of 7 days at 20° C. before being measured for hardness using a TAX2 Plus texture analyzer using a P2 Needle and 3 mm penetration depth into the product. The tablets were penetrated until a standard deviation of below 5% was obtained (typically needed eight penetrations). The hardness/texture was also measured for 27° C. For these measurements, after the initial 7 days of storage at 20° C., samples were transferred into a 27° C. cabinet for 24 hours+/−1 hour before texture measurement. Texture measurements are shown below in table 9 and values are shown in g (force) measured.

Bloom evaluations were made under four different storage conditions of both isothermal and cycling temperature. The chocolate tablets were stored for minimum of 3 days at 20° C. before being moved to different isothermal cabinets of 20° C., 23° C., and 25° C. and a cabinet with a temperature that can cycle between 25° C., 31° C., and 20° C. Cycling took place between 25° C. and 31° C. with 12 hours' time interval. Every time samples went through 12 hours at 25° C. and 12 hours at 31° C., one cycle was completed. When a cycle included an evaluation period said cycle also included an intermittent storage at 20° C. for 6 hours at the end of said cycle. Bloom evaluation was performed after 5 hours at 20° C. and are summarized in table 9 below. Bloom evaluations were made according to a scale from 1-10. Character 1 signifies heavy bloom and no gloss whereas character 10 signifies no bloom and high gloss. Character 4 marks the onset of a very weak bloom, and character 3 is substantial amount of bloom.

TABLE 9

| | Chocolate IV | Chocolate V | Chocolate VI |
|---|---|---|---|
| Texture/g (force) at 20° C. | 1050 | 864 | 830 |
| Texture/g (force) at 27° C. | 263 | 164 | 162 |
| Bloom stability/cycled 25-31° C. (days) * | 19 | 46 | 36 |
| Bloom stability/20° C. isothermal (weeks) ** | 50 | 50 | 50 |
| Bloom stability/23° C. isothermal (weeks) ** | 50 | 50 | 50 |
| Bloom stability/25° C. isothermal (weeks) ** | 31 | 50 | 50 |

* Results show number of days until substantial amount of bloom (value 3) was obtained.
** Results show number of weeks until substantial amount of bloom (value 3) was obtained.

Results of the table 9 above showed that chocolate V, which is comprising 3% of a milk fat replacer according to the present invention has a softness similar to that of chocolate VI, which is comprising 3% milk fat. In addition, both chocolates V and VI had significantly improved bloom stability at higher temperatures (>25° C.) compared to chocolate IV. Chocolate V had notably longer bloom-stability at cycled temperature of 25-31° C. compared to chocolates IV and VI. These results suggest that by 3% replacement of CBE in the chocolate recipe with a milk fat replacer according to the present invention, it is possible to produce a milk-free vegan chocolate that has a soft texture and long bloom-stability, which is typical of a milk chocolate.

The invention claimed is:

1. A milk fat replacer comprising triglycerides of which:
from 25% to 40% by weight is selected from SatOSat, SatSatO, or combinations thereof,
from 18% to 35% by weight is selected from OSatO, SatOO, or combinations thereof, and
from 15% to 25% by weight is selected from UUU,
the ratio of SatSatO/SatOSat is in a range from 1.5 to 2.5, and
the ratio of SatOO/OSatO is in a range from 1.5 to 2.5; and
wherein, in said milk fat replacer the:
sum of C6-C12 fatty acids is 15% or less by weight,
sum of C16 fatty acids is from 7% to 30% by weight, and
sum of saturated fatty acids (SAFA) is from 30% to 60% by weight; and
wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

2. The milk fat replacer according to claim 1, wherein the sum of C6-C12 fatty acids is 10% by weight or less.

3. The milk fat replacer according to claim 1, wherein the sum of C16 fatty acids is from 10% to 25% by weight.

4. The milk fat replacer according to claim 1, wherein the sum of saturated fatty acids is from 35% to 50% by weight.

5. The milk fat replacer according to claim 1, wherein from 28% to 36% by weight is selected from SatOSat, SatSatO, or combinations thereof.

6. The milk fat replacer according to claim 1, wherein the ratio of SatSatO/SatOSat is in a range from 1.5 to 2.25.

7. The milk fat replacer according to claim 1, wherein from 20% to 30% is selected from OSatO, SatOO, or combinations thereof.

8. The milk fat replacer according to claim 1, wherein the ratio of SatOO/OSatO is in a range from 1.5 to 2.25.

9. The milk fat replacer according to claim 1, wherein from 15% to 22% by weight is selected from UUU.

10. The milk fat replacer according to claim 1, wherein the milk fat replacer comprises shea oil and/or fractions hereof, palm oil and/or fractions hereof, or combinations thereof.

11. The milk fat replacer according to claim 1, wherein the triglycerides in the milk fat replacer comprise randomly distributed fatty acids.

12. The milk fat replacer according to claim 11, wherein the milk fat replacer consists of randomly interesterified vegetable oil parts.

13. The milk fat replacer according to claim 11, wherein the randomly distributed fatty acids in the milk fat replacer are obtained by an interesterification or a transesterification of vegetable oil parts.

14. A milk fat replacer comprising triglycerides of which:
from 28% to 36% by weight is selected from SatOSat, SatSatO, or combinations thereof,
from 23% to 30% by weight is selected from OSatO, SatOO, or combinations thereof, and
from 15% to 22% by weight is selected from UUU,
the ratio of SatSatO/SatOSat is in a range from 1.5 to 2.1, and
the ratio of SatOO/OSatO is in a range from 1.5 to 2.1; and
wherein, in said milk fat replacer the:
sum of C6-C12 fatty acids is 5% or less by weight,
sum of C16 fatty acids is from 10% to 17% by weight, and
sum of saturated fatty acids (SAFA) is from 38% to 48% by weight; and
wherein Sat is a saturated fatty acid selected from St (stearic acid), P (palmitic acid), or combinations thereof, and U is an unsaturated fatty acid selected from O (oleic acid), Li (linoleic acid), Le (linolenic acid), or combinations thereof.

15. A fat mixture comprising the milk fat replacer according to claim 1, wherein the fat mixture further comprises a vegetable fat composition.

16. A chocolate or chocolate-like product comprising from 1% to 20% by weight of the milk fat replacer according to claim 1.

17. The chocolate or chocolate-like product according to claim 16, wherein the chocolate or chocolate-like product is dairy-free, lactose-free, plant-based, and/or vegan.

18. The chocolate or chocolate-like product according to claim 16, wherein the chocolate or chocolate-like product further comprises other fats selected from cocoa butter equivalents (CBE) and/or cocoa butter.

19. The chocolate or chocolate-like product according to claim 16, wherein the chocolate or chocolate-like product is form-stable at temperatures above 25° C.

20. A method of making a chocolate- and/or a chocolate-like product comprising addition of the milk fat replacer according to claim 1.

21. The milk fat replacer according to claim 12, wherein the randomly distributed fatty acids in the milk fat replacer are obtained by a chemical interesterification of vegetable oil parts.

22. A method of making a bakery product comprising addition of the milk fat replacer according to claim 1.

23. A method of making a dairy product comprising addition of the milk fat replacer according to claim 1.

24. A method of making a coating or enrobing product comprising addition of the milk fat replacer according to claim 1.

25. The method according to claim 24, wherein the coating or enrobing product is for bakery, confectionery, and/or moulding applications.

26. A method of making a filling product comprising addition of the milk fat replacer according to claim 1.

27. The method according to claim 26, wherein the filling product is a bakery filling product.

28. The method according to claim 26, wherein the filling product is a confectionary filling product.

29. The method to claim 26, wherein the filling product is for a chocolate or chocolate-like product.

* * * * *